3,017,397
ACRYLONITRILE-CYCLIC SULPHONE COPOLYMERS

André Fournet and Hubert Lemoine, Lyon, France, assignors to Societe des Usines Chimiques Rhone-Poulenc, Paris, France, a French body corporate
No Drawing. Filed Mar. 7, 1960, Ser. No. 12,950
Claims priority, application France Mar. 13, 1959
8 Claims. (Cl. 260—79.3)

This invention relates to new acrylonitrile copolymers having an affinity for basic dyes.

It is well known that polyacrylonitrile and many acrylonitrile copolymers are difficult to dye owing to their lack of affinity towards dyes commonly used in industry. In particular they lack affinity towards the large class of basic dyes such as are used in dyeing wool.

It is an object of the present invention to provide a class of polymers which shall have the general properties of polyacrylonitrile, in particular as regards its conversion into filamentary materials and films, but which shall have a useful degree of affinity for basic dyes.

This object has been achieved by the discovery of a new class of acrylonitrile copolymers which contain, as one monomer component, certain cyclic sulphones.

The copolymers of the invention are copolymers of acrylonitrile, with or without an acrylic or methacrylic ester, with unsaturated cyclic sulphones of the general formula:

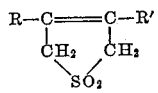

in which R and R' are hydrogen atoms or hydrocarbon groups, more especially alkyl or aryl groups. Filaments and films prepared from these copolymers have an excellent affinity for basic dyes, as also remarkable whiteness and stability towards heat and light.

The simplest cyclic sulphone which can be used in accordance with the invention and that preferred, is 1:1-dioxythiacyclopent-3-ene, also called butadiene sulphone, in which R and R' are hydrogen atoms, and which is readily obtained by reaction of sulphur dioxide with butadiene. The higher sulphone homologues are obtained in the same way from the homologues of butadiene, such for instance as isoprene, dimethylbutadiene and arylbutadienes, e.g. phenyl butadiene.

The proportion of sulphone in the copolymers may range from 0.1% to 15% or even 20% by weight, but very good results are obtained with 0.5–1% of sulphone, and there is generally no advantage in using higher proportions. In any case the proportion of acrylonitrile in the copolymer is preferably not below 85%.

The copolymerisation may be effected in known manner, either batchwise or continuously, in aqueous solution or in aqueous emulsion, with catalysts of the free radical type, especially Redox systems.

When an acrylic or methacrylic ester enters into the constitution of the copolymer, its proportion may be from 0.5 to 10% by weight.

The copolymers obtained have essentially the same solubilities as acrylonitrile homopolymer, and can consequently be spun into filaments or formed into films with the aid of the same solvents as are already employed for polyacrylonitrile, and in the same ways.

For example films can be made by dissolving the binary and/or tertiary copolymers in sufficient dimethylformamide to give a solution of viscosity 300–500 poises and spreading the solution, by means of a doctor blade or other known means on any suitable surface, e.g. of glass.

Filaments can for example be made by extruding a solution of the copolymer in dimethylformamide or dimethylsulphoxide through a multi-hole spinneret into an evaporative medium or a spinning bath, and subjecting the resulting filaments to conventional treatments such as stretching and annealing.

The following examples illustrate the invention without limiting it.

Example I

Acrylonitrile is polymerised in 10% aqueous emulsion with a catalyst consisting of 0.5% of potassium chlorate and 1.62% of sodium bisulphite calculated on the weight of the acrylonitrile emulsion, at 40° C. and at a pH of 2.5 for one hour, in the presence of various quantities of butadiene sulphone. After polymerisation, the suspension is freed from unreacted acrylonitrile, filtered and then washed with hot distilled water to remove the small amount of the sulphone which remains unpolymerised.

In the following table, the proportion of acrylonitrile and of sulphone are given in the first and second columns respectively. The percentage conversion is indicated in the third column. The specific viscosities (determined at a concentration of 2 g. per litre in dimethyl formamide at 20° C.) are given in column 4. The last column indicates the percentage of sulphur in the copolymer.

| Acrylonitrile, percent | Sulphone, percent | Degree of conversion, percent | Specific viscosity | Percent of sulphur |
|---|---|---|---|---|
| 100 | 0 | 70 | 0.300 | 0.1 |
| 99 | 1 | 74.4 | 0.443 | 0.15 |
| 98 | 2 | 71.4 | 0.386 | 0.14 |
| 95 | 5 | 75.4 | 0.276 | 0.22 |
| 90 | 10 | 60.2 | 0.358 | 0.22 |

The sulphur content of the comparative specimen polymerised in the absence of sulphone is due to the presence of sulphur derived from the Redox system containing sodium bisulphite.

Films are prepared from these copolymers, and these films are dyed with Malachite Green. While the film obtained with the homopolymer without sulphone acquires only a faint green coloration, a very considerable improvement of the depth of dyeing is observed even with a proportion of only 1% of sulphone.

Example II

A mixture of 95% of acrylonitrile and 5% of isoprene sulphone was polymerised by the same procedure as in Example I. A degree of conversion of 60% was obtained. The copolymer had a specific viscosity of 0.562 and a sulphur content of 0.20%.

Films prepared from this copolymer have good affinity for dyes, which is very much higher than that exhibited by binary acrylonitrile-methyl methacrylate copolymers.

Example III

The procedure of Example I is followed, but with ternary mixtures formed of acrylonitrile (A), methyl methacrylate (B) and butadiene sulphone (C) in the proportions indicated in the first three columns of the following table:

| A, Percent | B, Percent | C, Percent | Degree of Conversion, Percent | Specific viscosity | Sulphur, Percent |
|---|---|---|---|---|---|
| 95 | 5 | 0 | 72 | 0.300 | 0.08 |
| 94 | 5 | 1 | 84.6 | 0.340 | 0.15 |
| 93 | 5 | 2 | 65.2 | 0.411 | 0.13 |
| 90 | 5 | 5 | 54 | 0.463 | |

Films are formed from the resulting copolymers, and it is found that the effect of the sulphone on the affinity for basic dyes is even greater than with the films of Example I.

Example IV

The same procedure as in Example III was followed, but with ternary mixtures of acrylonitrile (A), methyl methacrylate (B) and isoprene sulphone (C) in the proportions indicated in the following table:

| A, Percent | B, Percent | C, Percent | Degree of Conversion, Percent | Specific viscosity | Sulphur, Percent |
|---|---|---|---|---|---|
| 90 | 5 | 5 | 60 | 0.370 | 0.20 |
| 93 | 5 | 2 | 70 | 0.371 | 0.12 |
| 94.5 | 5 | 0.5 | 66 | 0.303 | 0.10 |

Films prepared from these copolymers have an affinity for basic dyes similar to that of the films of Example III.

Example V

In a 16-litre reactor, a mixture of 94.3% of acrylonitrile, 5.2% of methyl methacrylate and 0.5% of butadiene sulphone was continuously polymerised.

The copolymerisation was carried out in the presence of a potassium chlorate/sodium bisulphite catalyst at 60° C., a monomer concentration of 15% (calculated on all the reactants) being maintained, with a period of passage through the polymeriser of 2 hours.

The copolymer obtained had the following characteristics:

Specific viscosity: 0.395
Acid equivalent per kg. of polymer: 0.053 g.
Percentage of sulphur: 0.16%.

The degree of conversion to the copolymer was 71%.

The affinity of this copolymer for dyes was studied, and compared with that of a binary copolymer free from butadiene sulphone, containing 93.6% of acrylonitrile and 6.37% of methyl methacrylate, and having a specific viscosity and molecular weight similar to those of the sulphonated copolymer.

Samples of fibres (prepared as hereinbefore described from two copolymers) were dyed by heating at boiling point for 1 hour in an aqueous bath containing 1 cc. per litre of Sunaptol LT (of the Compagnie Française des Matières Colorantes), 1 cc. per litre of glacial acetic acid, 0.15 g. per litre of sodium acetate and 4% by weight of Basacryl G.L. Blue (of Badische Anilin & Soda Fabrik). In addition, specimens taken from the same batch were dyed by heating at boiling point for two hours in another aqueous bath of similar composition, but in which the Basacryl G.L. Blue had been replaced by 5% of Astrazon M Black (Bayer).

After dyeing, the samples were cut into sections 2 to 3 mm. long. The wad obtained was thereafter compressed into pellets 4 mm. thick and 25 mm. in diameter.

The light transmitting power of these pellets was studied with the aid of a Leres T. 2D spectrophotometer under the following conditions:

Daylight standardised in accordance with the C.I.E. 1931 system
Angle of incidence of the light: 45°
Angle of examination: 90°
Wavelength range: 400 to 700 m$\mu$
White colour chosen as standard: tablet of $MgCO_3$ of the Laboratoire Central d'Essai des Arts et Métiers.

There were obtained from tracings of the reflection curves for each of the two colours rested in the trichromatic coefficients $x$ and $y$ which give the chromaticity and the brilliance (or "brightness") Y.

| Trichromatic coefficients | Basacryl GL Blue | | Astrazon M Black | |
|---|---|---|---|---|
| | Binary standard | Sulphonated copolymer | Binary standard | Sulphonated copolymer |
| $x$ | 0.1837 | 0.1862 | 0.3353 | 0.3306 |
| $y$ | 0.1195 | 0.1187 | 0.3224 | 0.3497 |
| Y | 0.036 | 0.033 | 0.041 | 0.038 |

It is apparent from this table that the values of Y are lower (by 8.3% and 7.3% respectively) in the case of the copolymer containing butadiene sulphone, which corresponds to much deeper shades than in the case of the binary standard and thus to a distinctly greater affinity for dyes.

We claim:

1. A composition of matter consisting essentially of the copolymerisation product of 85–99.9% by weight of acrylonitrile, 0–10% by weight of a compound selected from the group which consists of acrylic and methacrylic esters, and 0.1–15% by weight of a cyclic sulphone of formula

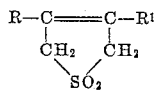

wherein R and $R^1$ are both selected from the group which consists of hydrogen atoms and hydrocarbon radicals.

2. A composition of matter consisting essentially of the copolymerisation product of 85–99.9% by weight of acrylonitrile, 0–10% by weight of a compound selected from the group which consists of acrylic and methacrylic esters, and 0.5–1% by weight of a cyclic sulphone of formula

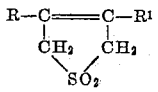

wherein R and $R^1$ are both selected from the group which consists of hydrogen atoms and hydrocarbon radicals.

3. A composition of matter according to claim 1 wherein the cyclic sulphone is 1:1-dioxy-thiacyclopent-3-ene.

4. A composition of matter according to claim 1 wherein the cyclic sulphone is 1:1-dioxythia-3-methyl-cyclopent-3-ene.

5. A composition of matter according to claim 1 wherein the cyclic sulphone is 1:1-dioxythia-3,4-dimethyl-cyclopent-3-ene.

6. A composition of matter according to claim 1 wherein the cyclic sulphone is 1:1-dioxythia-3-phenyl-cyclopent-3-ene.

7. Shaped structures having at least one dimension very small comprising a composition of matter consisting essentially of the copolymerisation product of 85–99.9% by weight of acrylonitrile, 0–10% by weight of a compound selected from the group which consists of acrylic and methacrylic esters, and 0.1–15% by weight of a cyclic sulphone of formula

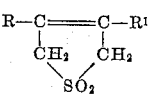

wherein R and $R^1$ are both selected from the group which consists of hydrogen atoms and hydrocarbon radicals.

8. Shaped structures having at least one dimension very small comprising a composition of matter consisting essentially of the copolymerisation product of 85–99.9% by weight of acrylonitrile, 0–10% by weight of a compound selected from the group which consists of acrylic and methacrylic esters, and 0.5–1% by weight of a cyclic sulphone of formula
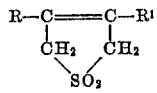
wherein R and R¹ are both selected from the group which consists of hydrogen atoms and hydrocarbon radicals.
References Cited in the file of this patent
UNITED STATES PATENTS
2,399,837    Upham ------------------ May 7, 1946
2,456,354    Young ------------------ Dec. 14, 1948